United States Patent [19]
Bradley

[11] Patent Number: 4,531,643
[45] Date of Patent: Jul. 30, 1985

[54] PORTABLE SPORTING IMPLEMENT HOLDER
[75] Inventor: Russell Bradley, Ashland, Ky.
[73] Assignee: Sporting Aid, Inc., Ashland, Ky.
[21] Appl. No.: 413,992
[22] Filed: Sep. 2, 1982

Related U.S. Application Data
[63] Continuation-in-part of Ser. No. 350,990, Feb. 22, 1982.
[51] Int. Cl.³ .............................................. A47F 7/00
[52] U.S. Cl. ...................................... 211/64; 211/86; 248/538
[58] Field of Search .................... 211/60 R, 64, 13, 17, 211/18, 19, 20, 86, 106; 248/512, 538

[56]   References Cited
U.S. PATENT DOCUMENTS

| 2,423,933 | 7/1947 | Gosh | 248/538 X |
| 2,526,067 | 10/1950 | Curtess | 248/512 |
| 2,606,731 | 8/1952 | Harris | 211/60 R |
| 3,385,544 | 5/1968 | Barnett | 248/538 X |
| 3,532,309 | 10/1970 | Reddick | 248/512 |
| 3,876,078 | 4/1975 | Gomes et al. | 211/64 |
| 3,926,393 | 12/1975 | Tainsh | 211/60 R X |
| 4,089,423 | 5/1978 | Gorham et al. | 211/64 |
| 4,245,419 | 1/1981 | McManus | 248/538 X |

Primary Examiner—Robert W. Gibson, Jr.
Attorney, Agent, or Firm—Murray, Whisenhunt & Ferguson

[57] ABSTRACT

A portable implement releasable holder is provided which has a base for securing to a rigid support therefore, and a first implement support member attached to the base and projecting upwardly therefrom. That first member has an enlarged uppermost portion which is sufficient in size to receive the stock of a sporting firearm, along with a downwardly disposed recess capable of receiving a portion of the handle of a fishing rod. A second implement support member is attached to the base and projects upwardly therefrom to a distance less than the distance of the first member. The second support member has an upwardly curved configuration such that a portion of the second member can receive and retain the butt portion of the stock of the sporting firearm. A clamping means is provided to secure the base to the support therefore.

5 Claims, 12 Drawing Figures

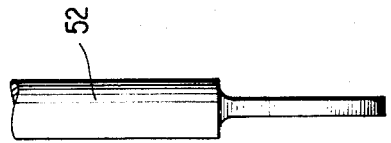
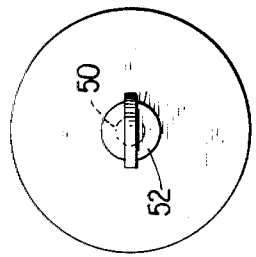
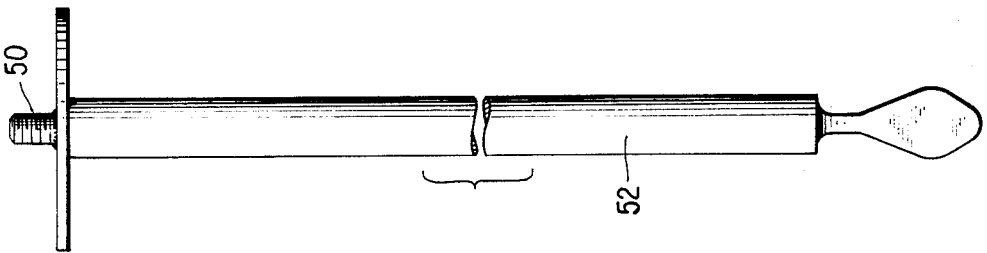
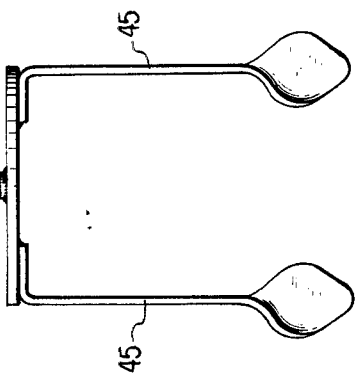
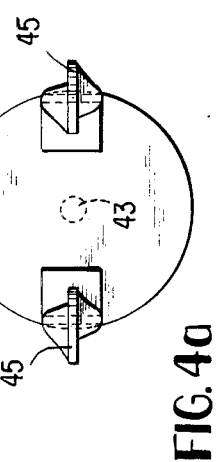
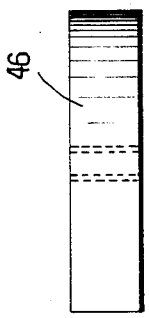
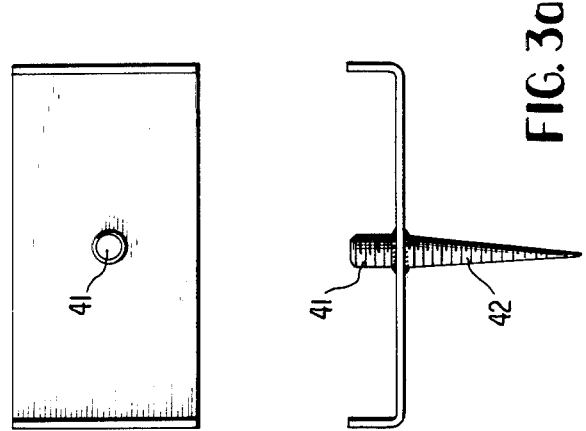
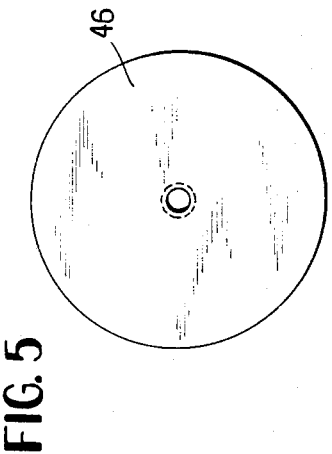

PORTABLE SPORTING IMPLEMENT HOLDER

This application is a continuation-in-part application of Ser. No. 350,990 filed Feb. 22, 1982.

The present invention relates to a portable sporting implement releasable holder, and more particularly to such a holder which can releasably hold, in a resting position, a wide variety of sporting implements, including firearms, fishing rods, bows, and related equipment.

BACKGROUND OF THE INVENTION

Sporting implements for the taking of game, including animals, fish, birds and the like, are usually relatively large implements, can have considerable weight, and are relatively unwieldy in holding the implements in a resting position. In addition, in the case of a sporting firearm, a satisfactory resting position can also include unnecessary risk for accidental discharge. Thus, in a resting position, a sporting rifle is often simply leaned against some convenient upright, such as a tree, and in this resting position the rifle is often precariously balanced and can be easily dislodged from that position and accidentally discharged. Sporting rifles and sporting bows, as well as other similar sporting weapons, cannot be satisfactorily rested on the ground, because of undesired contact with dirt and moisture. Similarly, other sporting implements, such as fishing rods, cannot be rested simply by lying the implement on the ground, since in that position the implement is not easily graspable for immediate action upon a strike of a fish and can be contaminated by dirt and moisture.

In many sporting activities there are long periods where the sporting implement involved is in a resting position. For example, in deer hunting, the deer rifle may be kept in a resting position for long periods of time at a deer hunting stand. Similarly, a hunting bow will remain in such resting position for long periods of time. Likewise, a fishing rod, during inactivity of the fish, may be in a resting position for long periods of time.

The art has provided a number of sporting implement holders for holding these implements during those resting periods. In general, these holders are designed, primarily, for only one implement, e.g. a fishing rod or a rifle or a bow, but not designed to accommodate a wide variety of such sporting implements. Furthermore, in general, these holders are designed for limited holder mounting opportunities, for example limited to mounting only on a horizontal surface such as the gunwales of a canoe or a prefabricated stand or deer hunting stand. As a result, in the use of such holders, the sportsman often finds the holder to be inapplicable for mounting on supports available to the sportsman at a particular time. Even more of a disadvantage, is that the prior art holders will accommodate essentially only one implement and if the implements are changed during the course of an activity, e.g. during the course of a day's hunt, a succession of holders must be carried and used.

Disadvantages of the above nature, have severely limited the utility of known sporting implement holders and these holders are not in wide use by sportsmen. It would, therefore, be of substantial advantage to the art to provide a sporting implements holder which is capable of securely holding at rest a variety of sporting implements, which can be adjusted to accommodate different configurations of this variety of sporting implements, and which can be securely mounted to a variety of available supports.

OBJECTS OF THE INVENTION

It is therefore an object of the present invention to provide a sporting implements holder which can securely hold in a resting position a wide variety of sporting implements, including but not limited to sporting firearms (rifles and pistols), hunting bows, fishing rods and the like. It is another object of the invention to provide such holder with capabilities of the holder being mounted to a variety of supports, including but not limited to horizontal and vertical supports, inclined supports and even the ground itself. It is another object of the invention to provide such a holder which is adjustable for accommodating the particular configuration of these above-noted various sporting implements. Finally, it is an object of the invention to provide such a holder which is easily portable, relatively inexpensive to manufacture, but which is rugged in construction and durable in field use.

CITATION OF PRIOR ART

The following U.S. patents were turned up in a search of the prior art: U.S. Pat. Nos. 1,579,552 issued Apr. 6, 1926; DES. 136,856, issued December 1943; DES. 143,952, issued February 1946; 2,959,295, issued November 1960; 3,037,314, issued June 1962; 3,266,633, issued August 1966; 3,277,813, issued November 1973; DES. 231,925, issued June 1974; 3,835,568, issued September 1974; and 4,089,423, issued May 1978.

BRIEF DESCRIPTION OF THE INVENTION

The invention is based on three primary discoveries and several subsidiary discoveries. First, it was discovered that for a sporting implements holder to accommodate a wide variety of sporting implements, including firearms, bows and fishing rods, the holder must have two upstanding support members, one of which upstands a greater distance from the base of the holder than the other of the members. This provides a support angle for the implement resting in the holder which will, by virtue of the weight of the implement, cause a wedging of the implement in the holder to securely lock that implement in the holder. As a subsidiary feature in this regard, the lowermost upstanding member should not be a closed member, i.e. should have a separated upstanding portion thereof, in order to accommodate the various shapes of the sporting implements and securely wedge those implements within the holder.

As a second discovery, it was found that the holder must be attached to a base which is a "universal" type base in that it can be attach to a support and place the holder in essentially a vertical position, eventhough the support may be in either a horizontal, vertical or inclined position. As a subsidiary discovery, it was found that to achieve this universal positioning, that base must be attached to the holder not only in a rigid manner but in an adjustable manner.

Finally, it was discovered that in order to accommodate a wide variety of sporting implements, the holder must not only be field adjustable, but adjustable in a predictable and easy manner. As a subsidiary discovery, it was found that a mechanically adjusted holder was impractical for field use and too expensive for manufacture. Thus, the adjustment of the present invention is made by providing the holder of a material which is rigid in use, but which can be manually bent to accommodate particular shapes of particular sporting implements.

Thus briefly stated, the present invention provides a portable sporting implement releasable holder which comprises a base adapted to be secured to a rigid support therefor. A first implement support member is attached to the base and projects upwardly to a predetermined distance from the base. The first member has an enlarged uppermost portion which enlargement is of sufficient size to receive the stock of a sporting firearm and the enlarged portion also has a downwardly disposed recess capable of receiving a portion of a handle of a sporting fishing rod. A second implement support member is attached to the base and projects a predetermined distance upwardly from the base. However, the predetermined distance which the first support member projects from the base must be greater than the predetermined distance which the second support member projects from the base. Further, the second support member must have an upwardly curved and angled configuration such that at least a portion of the second support member can receive and retain the butt portion of the stock of a sporting firearm. Most preferably, the second support member is opened at its uppermost portion so that the opening may receive portions of a fishing rod, especially certain reels therefor. A clamping means is secured to the base for adjustably clamping the base to a rigid support therefor. Most preferably, this adjustable clamping is of a "universal" clamping type.

BRIEF DESCRIPTION OF THE DRAWINGS

FIG. 3 and FIG. 3a are a top view and a side view, respectively, of an alternate clamping device for securing the holder by threaded engagement into wood and the like;

FIG. 4 and FIG. 4a are a side view and a bottom view, respectively, of an alternate clamping device for securing the holder to the ground or the like;

FIG. 5 and FIG. 5a are a top view and a side view, respectively, of an alternate accessory plate; and FIG. 6 and FIG. 6a and FIG. 6b are a top view, side view (partially broken away) and bottom view, respectively, of an accessory for mounting the holder in the ground or the like.

DETAILED DESCRIPTION OF THE INVENTION

Figure 2:
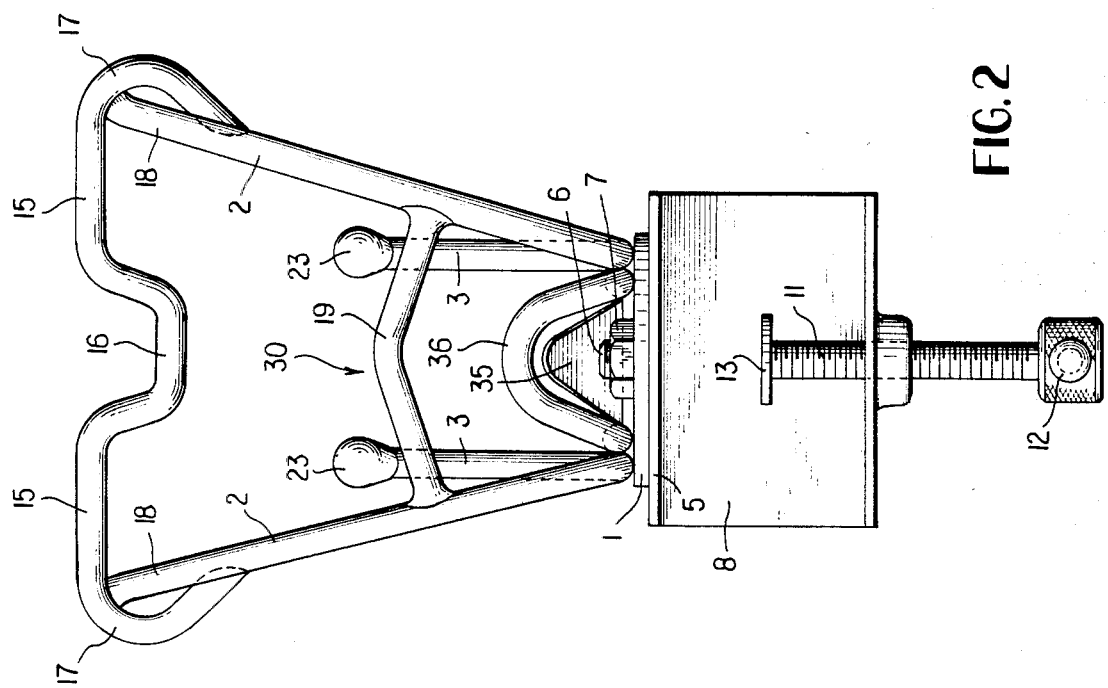
FIG. 2 is a front view of the holder of the invention.
Figure 1:
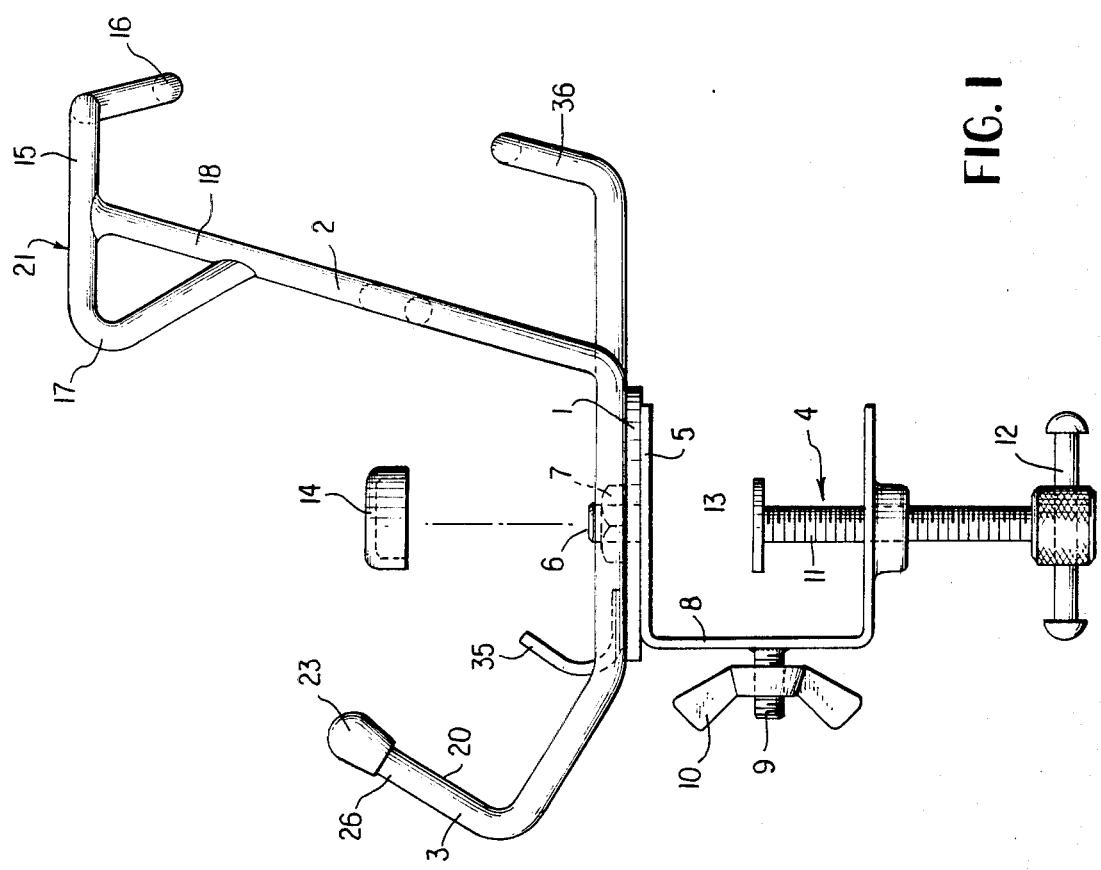
FIG. 1 is a side view of the holder of the invention.

Considering first FIGS. 1 and 2, the holder consists of a base 1, a first implement support member 2, and a second implement support member 3, with an adjustable clamping means, generally 4 secured to the base for adjustably clamping the base to a rigid support therefor. The base 1 is attached to an upper clamping member 5 by way of a bolt 6 and nut 7. Disposed on vertical clamping member 8 is an additional bolt 9 having thereon a wing nut 10, or other like fastening device. A threaded rod 11 is operable, rotatably, by hand wheel 12 to move anvil 13 toward or away from upper clamping member 5. Thus, between upper clamping member 5 and anvil 13, a convenient support for the holder may be clamped. A convenient support in this regard may be a fence rail, a canoe gunwale, a portion of a deer stand and the like. As shown in FIGS. 1 and 2, the clamping means, generally 4, is configured to clamp the holder to a horizontally disposed support. However, by removing protective cap 14 from bolt 6 and nut 7, nut 7 may be removed from bolt 6 and, after removal of wing nut 10, bolt 9 may be passed through base 1 to secure the clamping means 4 in a configuration for clamping against a vertically disposed support, such as a tree limb, fence post, or the like. The purpose of wing nut 10 will be described hereinafter The first implement support member 2 may be attached to base 1 in any convenient manner, and indeed, base 1 may simply be a horizontal extension of both first support member 2 and second support member 3. First support member 2 projects a predetermined distance upwardly from base 1 and the first support member has an enlarged uppermost portion 15 which enlargement is sufficient in size to receive the stock of a sporting firearm, i.e. a rifle. This can be seen more clearly from FIG. 2 which is only slightly less than full scale of the preferred dimensions of the holder of the invention. The enlarged portion 15 will also have a downwardly disposed recess 16 which is of a size capable of receiving a portion of a handle of a sporting fishing rod. Again, this can best be seen in FIG. 2.

Preferably, first support member 2 will also have a pair of outwardly angled ears 17 which will provide more latitude in adjusting the holder to accommodate various particular configurations of sporting implements, particularly the stocks of firearms.

In this latter regard, first support member 2, as well as the second support member 3, are preferably made of a relatively rigid but bendable material, such as mild steel wire, e.g. ⅛th to ¼ inch in diameter. Steel wire of that nature is sufficiently rigid that it can withstand considerable force without bending, so as to make the implements rigid in use, but which is sufficiently bendable that an adult male can bend the wire when the holder is rigidly clamped to a rigid support. This is particularly important for field adjustment of the holder when a succession of, for examle, rifles are to be used in hunt, as will be explained more fully hereinafter. Even more preferably, the mild steel wire of which the support members are constructed is coated with a yieldable plastic or rubber material (not shown on the drawings for the sake of clarity) such that the sporting implements will not be scratched or otherwise marred while in the resting position in the holder.

First support member 2 is preferably comprised of angularly disposed upwardly projecting rods 18 having an upwardly disposed angularly configured crossing brace 19.

The second implement support member 3 projects a predetermined distance upwardly from base 1, but the predetermined distace of the first support member is greater than the predetermined distance of the second support member, as shown more clearly in FIG. 1. Generally speaking, the first support member should project a distance of from 1.5 to 2.5 times the upward projection of the second support member, but more usually the first member will project a distance approximately 2 times the upward projection of the second support member. This will provide the correct angular resting position of the implement, such as a fishing rod or rifle, which correct angle is between about 45° and 70°. Thus the distance between supports 2 and 3 and the relative projections thereof should provide the correct angle.

Figure 7:
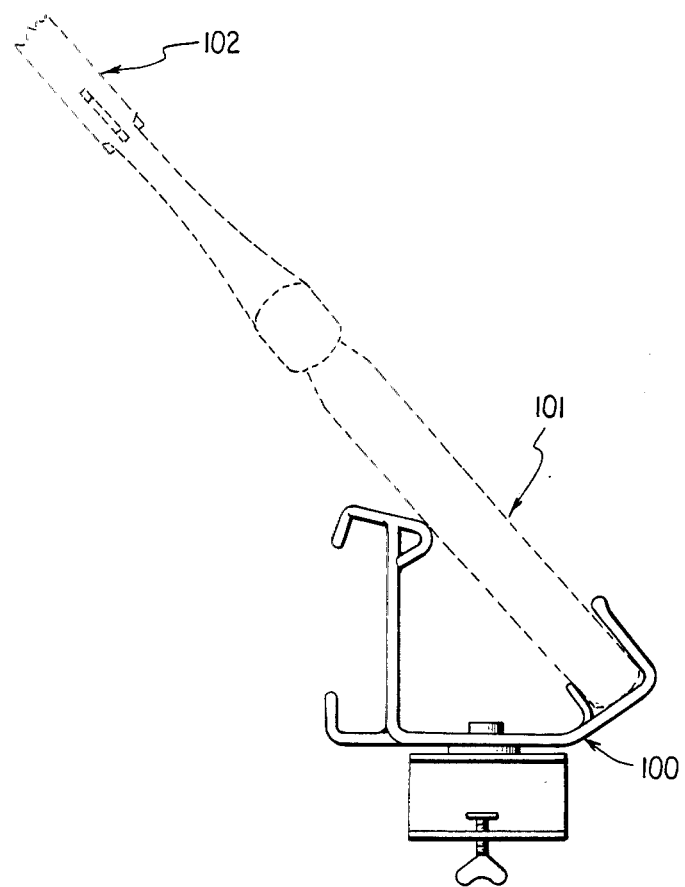
FIG. 7 is a side view of the holder with a rifle butt supported therein, the rifle butt being partially shown in dashed lines.

The second support member will have an upwardly curved or angled configuration, as best seen in FIG. 1, such that at least a portion of the second support member can receive and retain the butt portion of the stock of a sporting firearm. Thus, as can be seen in FIG. 1, the stock of a rifle will rest in the holder at an angle of approximately 60° to the right as viewed in FIG. 1, with the uppermost surface of the butt of the stock contacting the inner surface 20 of the second support member 3 and either the inner surface 21 of the first support member 2 or the ears 17 or both. FIG. 7 shows such a disposition of a rifle (partially shown in dashed lines) where the holder 100 supports a rifle butt 101 with the receiver and trigger mechanism 102 being above the holder 100. Most preferably, a yieldable material will be used in the form of a cap 23 on the terminis of the second support member to avoid marring or scarring of the stock of the rifle.

Most preferably, the second support member 3 is so curved or angled in configuration that the spacial direction of the uppermost portion 26 thereof is toward the first support member, as better seen in FIG. 1.

Further, and most preferably, second support member 3 will consist of 2 such angled rods with an opening, generally 30, thereinbetween, as seen in FIG. 2, although those rods may connect to form a closed configuration of second support member 3. The purpose of opening 30 is to accommodate a variety of sporting bows and reels. Sporting bows normally have a bow string pulley at the outer extremities of the bows and in resting the bow in the holder, it is advantageous to provide means for receiving and retaining the pulley asociated with the end of the bow held by the holder. Thus, opening 30 will allow the one end of the bow to be retained by the holder while the opening 30 will receive the pulley at the end of the bow. Essentially the same explanation is true in connection with some fishing rod reels. Accordingly, for most utility of the holder it is therefore preferred that the second support member have an opening at its uppermost portion such that opening can receive a bow string pulley of a sporting bow or the reel of a sporting rod.

Further, in connection with the resting of a sporting bow in the holder, it is also preferable that an inclined upstanding smaller third support 35 be provided, since this will furher support one end of the bow. Smaller support 35 may also be apertured so that that support in conjunction with horizontally disposed support 36 can function for holding the fishing rod and accessories, the latter of which will be explained more fully hereinafter. However, in the former regard, as can be seen from FIGS. 1 and 2, if it is desired to rest a fishing rod in an essentially horizontal position, then the butt end of the rod will rest against inner surface 20 of second support member 3, on the top of smaller support 35, on the top of horizontal support 36 and underneath brace 19. Since brace 19 is angularly upwardly configured, it will center the handle of the fishing rod therein while providing relatively firm support therefor. On the other hand, if it is desired to rest a fishing rod in a relatively inclined position, it is placed in the holder in the manner described above in connection with the rifle stock, with the exception that the rod will be snuggly placed in recess 16, which will center the rod in the holder and releasably but snuggly hold the rod in place.

In connection with accessories, horizontal support 36 is preferably of the upturned configuration shown in FIGS. 1 and 2, since it will not only function in the foregoing manner but can be used for hanging a lantern or other accessory thereon, especially for night fishing.

Turning now to FIG. 3, bolt 41 can be secured to base 1 by way of nut 7 and the threaded portion 42 of bolt 41, which will generally be in the form of a high angled wood thread, can be used for threadedly engaging bolt 41 into a convenient surface, such as the limb of a tree for supporting the holder.

Alternatively, as shown in FIG. 4, bolt 43 may be secured to base 1 by nut 7 and flaired supports 45 may be pressed into the ground for supporting the holder above the ground. If desired, the plate 46 of FIG. 5 may be used in conjunction with bolt 43 for providing an accessory table.

Alternatively, bolt 50 of FIG. 6, may be held to base 1 by nut 7 and extension 52 can be driven into the ground for supporting the holder above the ground.

The above describes holding rifles, fishing rods and bows in a resting position. The holder may also be used to rest a handgun, where the butt of the gun is placed in opening 30 (see FIG. 2) and the barrel of the gun is placed in recess 16. Thus, the holder may accommodate rifles, pistols, cross-bows, recurved bows, compound bows, fishing rods and reels, among other sporting implements. All of the implements are releasably held in the holder such that they are in a state of readiness, but at the same time the sportsman is relieved of physical fatigue, cramps and the like from maintaining the implements in position. Further, as can be appreciated from the above, the implements are held in place in the holder under somewhat of a spring pressure by action of the wedging or cantilevering of the implement and this factor increases th steadiness of the implement in the resting position. Further, as the sportsman moves from position to position, since the clamping means is releasably secured to the base and since the clamping means is adjustable to clamping to both vertical and horizontal supports therefor, as well as inclined supports, the sportsman has a variety of choices for the support base in new sporting positions, e.g. in moving from stand to stand in deer hunting. Thus, the sportsman does not need to carry a variety of holders to accommodate different clamping supports. Further, with the accessories of FIGS. 3 through 6, the base is securable to a ground penetrable spike for supporting the holder from the ground and this provides even greater latitude for the sportsman in utilizing the holder in different terrains and without other rigid support members being available. The wood screw threads of FIG. 3 even allow the sportsman to secure the holder to the limb of a tree or the like.

Furthermore, since the holder is made of mild steel or some like bendable material, the angle at which an implement is held in the holder, as determined by the configuration and spacing of the first and second support members, can be adjusted in the field by bending. As noted above, preferably, the material of construction is such that it is rigid under ordinary conditions, but is bendable by an adult male when the holder is in a rigid clamped position. Thus, even if the holder is clamped in a position where the implement is not positioned at a secure angle in the holder, the first and second support members, or either one thereof, can be manually bent to change that angle. Since, preferably, the holder has a coating of a yieldable material such as plastic, e.g. polyvinylchloride, polyethylene, rubber and the like, not only is a more resistant surface provided, but the yieldable material makes it more comfortable for the sportsman to bend the holder to accommodate the different configurations of a particular implement.

As a further advantage, a variety of accessories can be attached to the holder by means of wing nut 10, which will always be available for either bolt 6 or bolt 9 (one of which will not be in use with the clamping member) for attaching those accessories to the holder.

Thus, the objects of the invention have been achieved by the present invention, but it will be appreciated that modifications thereof will be apparent to those skilled in art. It is therefore intended that those obvious modifications be embraced by the spirit and scope of the annexed claims.

It is claimed:

1. A portable sporting implement releasable holder, comprising:
    (1) a base adapted to be secured to a rigid support therefore;
    (2) a first implement support member attached to said base and projecting a predetermined distance upwardly from said base, said first support member having an enlarged uppermost portion, which enlarged portion is of sufficient size as to receive the stock of a sporting firearm near the butt thereof, and said enlarged portion also having a downwardly disposed recess capable of receiving a portion of a handle of a sporting fishing rod;
    (3) a second implement support member attached to said base and projecting a predetermined distance upwardly from said base, and wherein the said predetermined distance of said first support member is greater than said predetermined distance of said second support member, whereby said implement is disposed in said holder such that a support angle of the implement is established which is sufficient to wedge said implement between said first and second support members and said second support member having an upwardly curved or angled configuration such that at least a portion of said second support member can receive and retain the butt portion of the stock of a sporting firearm; said first and second support members being made of a rigid but manually bendable material and
    (4) an adjustable means secured to said base for adjustably clamping said base to said rigid support therefore such that the holder may be placed in an essentially vertical position even though the said rigid support may be in a horizontal, vertical or inclined position.

2. The holder of claim 1 wherein said clamping means is releasably secured to said base.

3. The holder of claim 1 wherein said base is securable to a ground penetrable spike for supporting said holder from the ground.

4. The holder of claim 1 wherein the said second support member is so curved or angled in configuration that the spacial direction of the uppermost portion thereof is toward the said first support member.

5. The holder of claim 1 wherein the second support member has an opening at its uppermost portion such that the opening can receive a bow string pulley of a sporting bow.

* * * * *